United States Patent [19]

Hack et al.

[11] Patent Number: 5,422,766
[45] Date of Patent: Jun. 6, 1995

[54] GASKET FOR SEALING A DISK DRIVE ASSEMBLY

[75] Inventors: Paul J. Hack; Leo R. Talbot, both of San Jose, Calif.

[73] Assignee: Maxtor Corporation, San Jose, Calif.

[21] Appl. No.: 176,540

[22] Filed: Jan. 3, 1994

[51] Int. Cl.⁶ .............................................. G11B 33/14
[52] U.S. Cl. ................................................... 360/97.02
[58] Field of Search ........................ 360/97.01–97.03, 360/97.04, 78.04; 428/78

[56] References Cited

U.S. PATENT DOCUMENTS

| | | | |
|---|---|---|---|
| 4,405,136 | 9/1983 | Elsing et al. | 277/12 |
| 4,950,521 | 8/1990 | Takamura et al. | 428/78 |
| 5,004,207 | 4/1991 | Ishikawa et al. | 360/97.02 X |
| 5,150,267 | 9/1992 | Reinisch | 360/97.02 |
| 5,187,621 | 2/1993 | Tacklind | 360/97.02 |
| 5,194,696 | 3/1993 | Read | 174/65 R |
| 5,223,996 | 6/1993 | Read et al. | 360/97.02 |
| 5,272,580 | 12/1993 | Hickox et al. | 360/97.02 |
| 5,282,101 | 1/1994 | Reinisch | 360/97.03 |
| 5,293,282 | 3/1994 | Squires et al. | 360/97.03 |

FOREIGN PATENT DOCUMENTS

| | | | |
|---|---|---|---|
| 62-279586 | 12/1987 | Japan | 360/97.02 |
| 62-279587 | 12/1987 | Japan | 360/97.02 |

Primary Examiner—John H. Wolff

[57] ABSTRACT

An enclosure for a magnetic recording system comprises a baseplate, and a cover secured to the baseplate to form a housing. A rectangular groove is provided around the periphery of the baseplate and cover. Disposed within the cover and baseplate grooves is a gasket for sealing the cover/baseplate interface. The gasket is cross-shaped and comprises a relatively soft urethane material. The gasket is molded to fit the geometric shape of the cover and baseplate and forms a three-point seal for sealing the internal components of the disk drive from the ambient environment when the cover is secured to the baseplate.

34 Claims, 2 Drawing Sheets

FIG_1
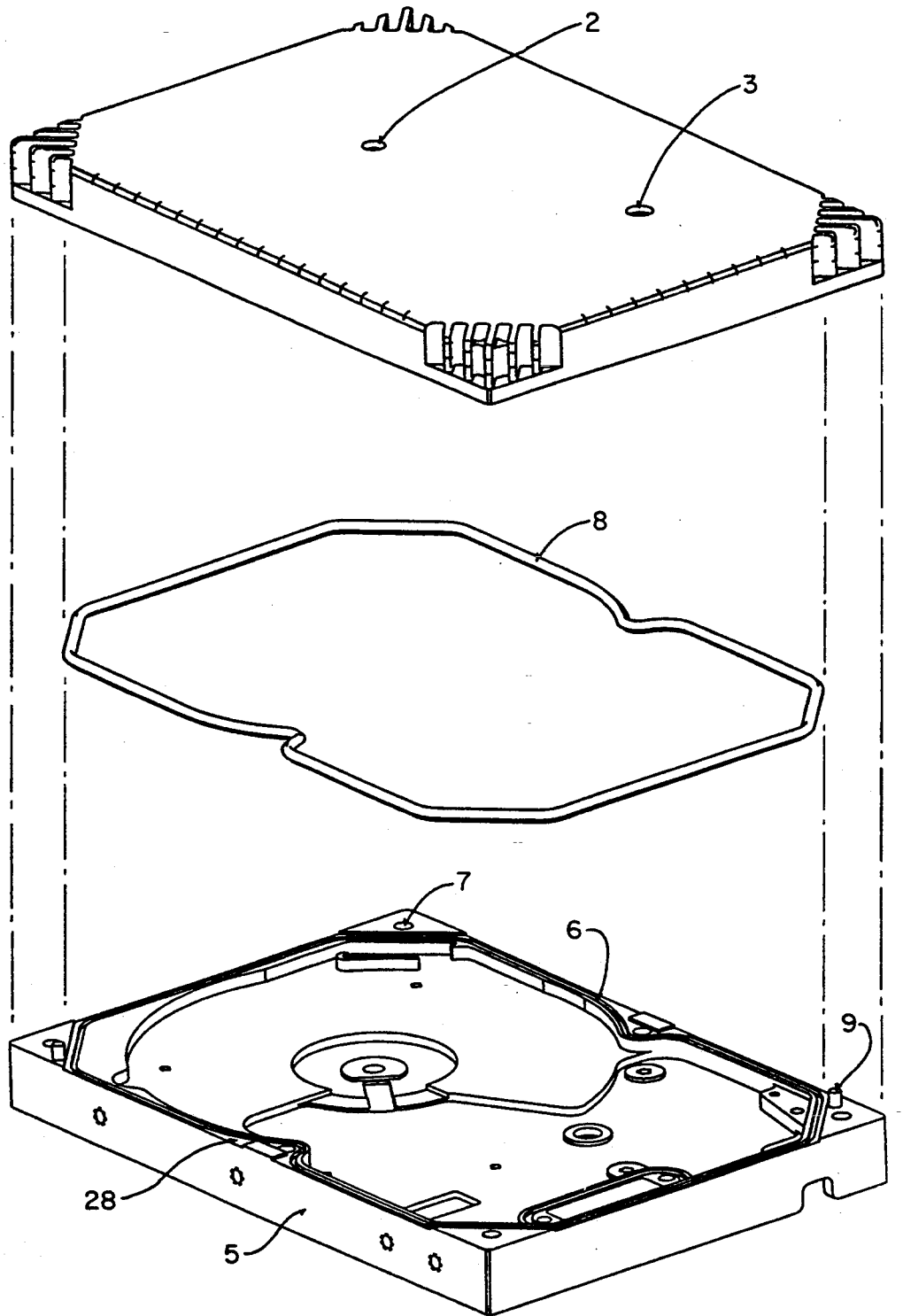

FIG_2
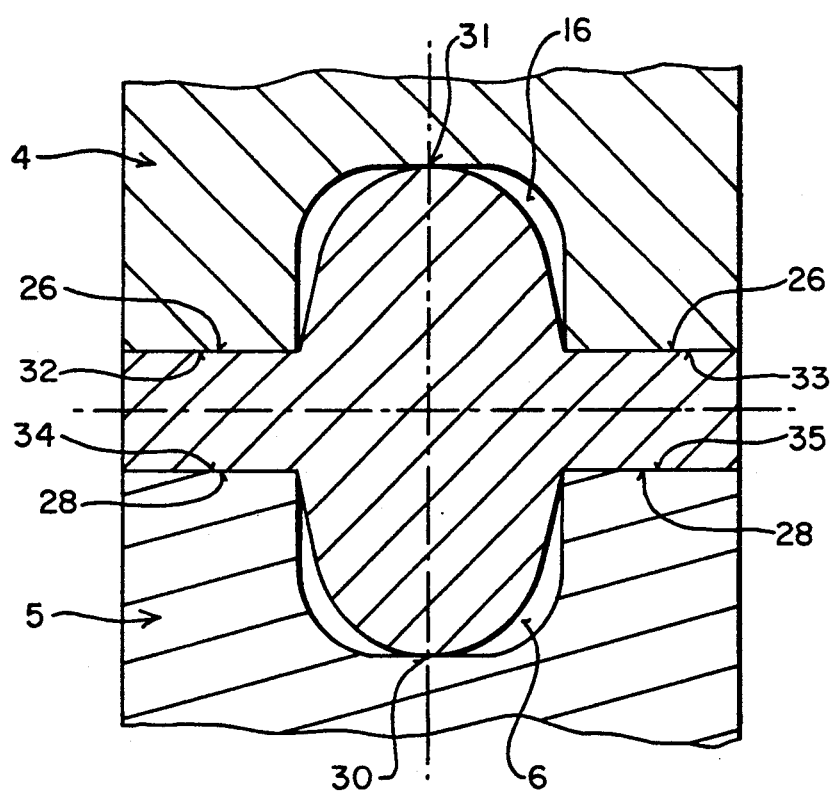
FIG_3
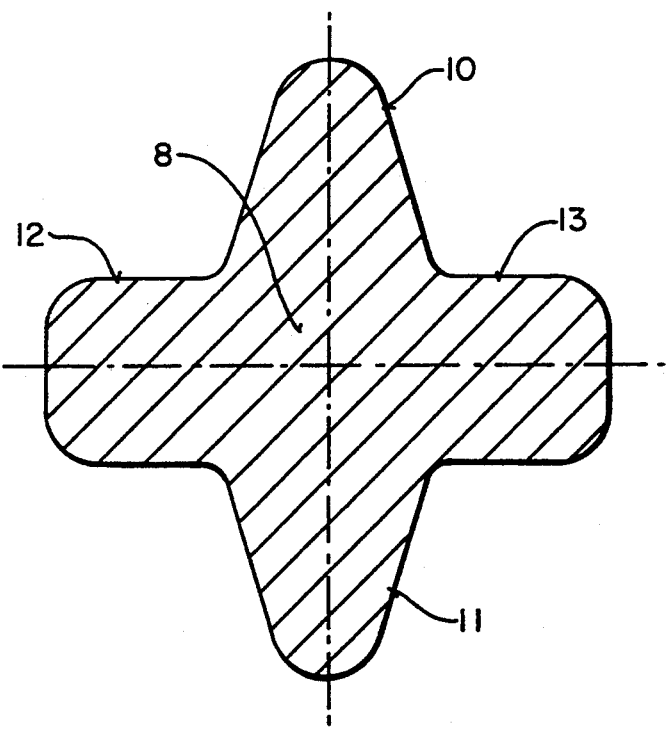

GASKET FOR SEALING A DISK DRIVE ASSEMBLY

FIELD OF THE INVENTION

The present invention relates to the field of magnetic recording, particularly to hard disk drive assemblies, and to apparatus and methods for enclosing such assemblies.

BACKGROUND OF THE INVENTION

Hard disk drive memory systems have been used in the field of magnetic recording for storage of digital information for many years. In modern disk drive technology digital information is recorded on concentric memory tracks of a magnetic disk medium. The disks themselves are rotatably mounted on a spindle. A magnetic head or transducer is disposed on the surface of the disk for transferring information (i.e., reading/writing) to/from the disks as they rotate at a high speed. The rotation of the rigid magnetic disks causes the magnetic heads to be hydrodynamically lifted above the surface of the recording medium. This hydrodynamic lifting phenomena results from the flow of air produced by the rotating magnetic disk. It is this air flow which causes the head to "fly" above the disk surface.

The current trend in the industry is toward increasing the data storage capacity of magnetic recording systems while maintaining or decreasing the physical size of the units. This has been achieved, in part, by lowering the slider flying height. Generally, this means that the separation between the head and disk must be reduced. For instance, very low flying heights on the order of 1-3 microinches are becoming increasingly common. Proposals for future drive assemblies include "in-contact" magnetic recording systems, wherein the head is in continuous contact with the surface of the magnetic medium.

In the quest to increase the data storage capacity of hard disk drive assemblies practitioners are faced with a number design problems. Among these are the need to minimize the introduction of environmental contaminants into the drive unit and the need to maintain operating temperatures within acceptable limits.

To satisfy these environmental needs, a typical hard disk drive assembly includes a cover and a baseplate that form a housing when attached. A seal between the cover/baseplate interface prevents environmental debris from entering the enclosure. Obviously, the accumulation of environmental debris within the enclosure is highly undesirable since it causes an increased wear rate on the disk. Environmental debris can also lead to random signal modulation.

The need to eliminate environmental debris from the interior of the assembly housing becomes imperative in "near-contact" and "in-contact" magnetic recording systems. As might be expected, when flying heights diminish, the magnetic head becomes more susceptible to the influence of the surface condition of the magnetic disk. Any environmental debris present on the disk surface might cause catastrophic damage in such systems.

In addition to heightening the need for better contamination control, the use of high capacity disk drives also introduces problems relating to power consumption and temperature control. While lower capacity disk drives generally operate at 3600 rpm, high capacity drives—in order to improve transfer rates—typically rotate the disk pack at speeds between 6300 and 7200 rpm. Higher operating speeds require an increase in drive motor input power which, in effect, results in higher operating temperatures. In addition, higher disk speeds create more windage which, in turn, increases the air resistance forces within the drive unit. Because the assembly drive and actuator motors must ultimately overcome these tribological forces, they require additional input power. The net effect is that high capacity drives require more power and operate at higher temperatures than their low capacity counterparts.

As the temperature of a disk drive rises it also radiates a larger amount of heat. Since hard disk drives are often situated in computer systems in close proximity with electrical boards, it is desirable to minimize the amount of heat dissipated by the units. Excessive heat not only reduces the component life of the drive unit, but can also cause electric circuits, chips and other computer components to malfunction.

One approach that has proved successful in reducing the operating temperature of high capacity disk drives has been the use of hermetically sealed units filled with an inert gas. Lower operating temperatures are achieved by reducing the tribological forces acting upon the disk drive mechanisms. The method includes evacuating all air from the drive housing and injecting it with an inert gas, such as helium or nitrogen, at a pressure between 7 to 8 psi. The use of a hermetically sealed chamber does, however, make the repair of internal components virtually impossible since the chamber junction must be cut in order to access the components throwing dust and debris into the chamber.

Another approach for sealing the cover/baseplate interface has been to use a wide, open-cell, flat gasket. However, since an open-cell gasket is incapable of providing a pressure seal, it is inappropriate for use in pressure filled chambers. Conventional gaskets are also prone to leakage at various points around the periphery of the enclosure.

Yet another sealing method entails the use of a closed-cell, elastomeric o-ring disposed within a groove provided in the disk drive baseplate. Once the o-ring is positioned in the groove, the cover is attached to the baseplate, thereby compressing the o-ring such that a point contact is made about the periphery of the cover/baseplate interface. Although closed-cell o-rings are capable of providing a pressure seal, there are several problems associated with their use.

Generally, o-rings work well and are cost effective in applications where sealing diameters are greater than 0.05 inches. However, when sealing diameters fall below 0.05 inches, gasket compression ratio problems may arise if tolerances are not held tightly within specification. For example, if the tolerance range is too large the gasket may become under-compressed, resulting in a poor seal. Conversely, if the tolerance range is too small the gasket may become over-compressed, eventually causing the gasket to lose its sealant properties over time. Maintaining size tolerances within tight specification limits is very costly and is a problem in high volume manufacturing.

Another problem associated with the use of o-rings is that it provides only one point of sealing contact separating the internal components of the disk drive from the ambient environment. One contact point is generally insufficient to ensure a proper seal; particularly when the seal is used to contain a pressurized gas.

Another problem associated with the o-ring approach is that o-rings of irregular shapes (i.e., not having an "O" shape) tend to curl and become dislodged from the baseplate groove when the cover is attached to the baseplate during the manufacturing process. Consequently, this method often results in a poor seal.

What is needed then is a solution to the numerous problems inherent in the prior art sealing technologies. As will be seen, the present invention provides an apparatus and method for enclosing a hard disk drive while solving the aforementioned problems.

SUMMARY OF THE INVENTION

An enclosure for a magnetic recording system is disclosed. In one embodiment, the present invention comprises a baseplate, and a cover secured to the baseplate to form a housing. A rectangular groove is provided around the periphery of the baseplate and cover. Disposed within the cover and baseplate grooves is a gasket for sealing the cover/baseplate interface. The gasket has an X-shape cross-section and is comprised of a relatively soft urethane material. The gasket is molded to fit the geometric shape of the cover and baseplate.

One of the salient features of the present invention is that the gasket forms a three-point seal for sealing the internal components of the disk drive from the external ambient environment. Hence, the seal is capable of maintaining a reliable pressure seal over an extended period of time. As a result of the gasket's shape and its ability to seal, the need to maintain tight manufacturing tolerances is obviated, thereby minimizing manufacturing costs. The invention is also ideally-suited for use in disk drive assemblies filled with a pressurized inert gas.

BRIEF DESCRIPTION OF THE DRAWINGS

The novel features believed characteristic to the invention are set forth in the appended claims. The invention itself, however, as well as other features and advantages thereof, will be best understood by reference to the detailed description that follows, read in conjunction with the accompanying drawings wherein:

FIG. 1 is an exploded view of the present invention.

FIG. 2 is a cross-sectional view of the present invention in a compressed state.

FIG. 3 is a cross-sectional view of the gasket of the present invention in an uncompressed state.

DETAILED DESCRIPTION

An enclosure for a hard disk drive assembly is disclosed. The enclosure includes an cross-shaped gasket for providing a three-point pressure seal at the assembly cover/baseplate interface. In the following description, numerous specific details are set forth such as material types, dimensions, shapes, etc., in order to provide a thorough understanding of the present invention. It will be obvious, however, to one of ordinary skill in the art that the invention may be practiced without these specific details. In other instances, well-known structures and processing steps have not been described in detail in order to avoid unnecessarily obscuring the present invention.

With reference to FIG. 1, an exploded view of an enclosure of a hard disk drive assembly is shown. Cover 4 contains through openings 2 and 3 which are typically provided to accommodate the means for securing the drive assembly spindle and actuator shafts (not shown) to cover 4. Cover 4 also contains groove 16 that is disposed about the cover's inside periphery (see FIG. 3). Baseplate 5 also has groove 6 disposed about its periphery. When cover 4 and baseplate 5 are attached, gasket 8 is disposed within grooves 6 and 16 to form a seal at the cover/baseplate interface. Baseplate 5 also includes guides 9 that aid in aligning baseplate 5 and cover 4 during the assembly process. Through openings 7 are provided to accommodate threaded fasteners (e.g. screws) that are used to attach cover 4 to baseplate 5.

As previously discussed, most hard disk drive assemblies require a seal at the cover/baseplate interface to prevent environmental debris from entering the unit. To reduce power consumption and lower operating temperatures some high capacity disk drive units are filled with a pressurized inert gas. These pressurized assemblies require a gasket that is capable of providing a pressure seal at the cover/baseplate interface.

The present invention utilizes an "X" or cross-shaped gasket at the cover/baseplate interface that establishes a three-point seal at each half of the cover/baseplate interface. The invention creates a reliable seal and alleviates the need for extremely tight machining tolerances. For example, in applications requiring an o-ring having a cross section of less than 0.05 inches, machining tolerances of 0.001–0.002 inches are generally required. In comparison, according to the present invention machining tolerances may be relaxed in most cases to approximately 0.005–0.006 inches.

Referring now to FIGS. 2, a cross-sectional view of the present invention in its compressed state is shown. Baseplate 5 and cover 4 are shown having faces 26 and 28 disposed about their respective peripheries. Grooves 6 and 16 are disposed in faces 26 and 28, respectively. In the embodiment shown, cover 4 and baseplate 5 comprise diecast aluminum. The cover and baseplate may also be machined. Other types of covers and baseplates may also be utilized, as long as they are capable of facilitating the cross-shaped gasket design.

Grooves 6 and 16 have a substantially rectangular cross-section with a width of 0.02 to 0.1 inches and a depth of 0.02 to 0.1 inches. Grooves 6 and 16 are fabricated by first die casting faces 26 and 28, and then end milling the grooves into their respective faces.

With reference to FIG. 3, a cross-sectional view of gasket 8 in its uncompressed state is shown. Gasket 8 comprises a closed cell, elastomeric material having an X-shaped cross-section. Preferably, gasket 8 comprises urethane having a 25A shore hardness. The gasket may, however, comprise Butyl or any other closed cell elastomeric material that is capable of providing a pressure seal at the cover/baseplate interface. Gasket 8 has two vertical members 10 and 11, and two horizontal members 12 and 13. In the embodiment shown, vertical members 10 and 11 have a substantially parabolic cross-sectional shape, whereas horizontal members 12 and 13 have a substantially rectangular cross-sectional shape.

With cover 4 attached to baseplate 5 gasket 8 forms a three-point seal on each half of the cover/baseplate interface. Vertical members 10 and 11 engage recesses 6 and 16 to form seals 30 and 31, respectively. Horizontal members 12 and 13 engage faces 26 and 28 to form seals 32, 33, 34 and 35. In the embodiment of FIG. 2, members 10, 11, 12 and 13, grooves 6 and 16, and faces 26 and 28 are sized such that a 19–33% gasket compression ratio is established when cover 4 is secured to baseplate 5. The prescribed gasket compression ratio not only ensures a good seal, but also prevents the gasket from experiencing a compression set.

Whereas many alternations and modifications to the present invention will no doubt become apparent to the person of ordinary skill in the art after having read the foregoing description, it is to be understood that the particular embodiments shown and described by way of illustration are in no way intended to be limiting. Therefore, reference to the details of the illustrated diagrams is not intended to limit the scope of the claims which themselves recite only those features regarded as essential to the invention.

What is claimed is:

1. An enclosure for a magnetic recording system comprising:
    a baseplate having a first face disposed about the periphery of said baseplate, said first face lying in a first plane, a first recess being disposed in said first face;
    a cover secured to said baseplate creating a space therebetween, said cover having a second face being disposed about the periphery of said cover, said second face lying in a second plane, said second plane being parallel to said first plane, said cover having a second recess being disposed in said second face such that said first and second recesses are aligned with one another, said first and second faces and said first and second recesses forming an interface between said cover and said baseplate; and
    a gasket for sealing said interface, said gasket having an X-shape cross-section being disposed between said first and second recesses and first and second faces.

2. The assembly as recited in claim 1, wherein said first and second recesses have a substantially rectangular cross-section.

3. The assembly as recited in claim 2, wherein said first and second recesses have a width of 0.02 to 0.1 inches and a depth of 0.02 to 0.1 inches.

4. The assembly as recited in claim 1, wherein said gasket comprises a closed-cell elastomeric material.

5. The assembly as recited in claim 4, wherein said gasket has a first and second vertical member and a first and second horizontal member, said first vertical member being disposed in said first recess, said second vertical member being disposed in said second recess, said first and second horizontal members being disposed between said first and second faces.

6. The assembly as recited in claim 5, wherein said first and second vertical members have a substantially parabolic cross-section, and said first and second horizontal members have a substantially rectangular cross-section.

7. The assembly as recited in claim 4, wherein said gasket has a 25A shore hardness.

8. The assembly as recited in claim 1, wherein said gasket and said first and second recesses are sized such that a 19% to 33% gasket compression ratio is established when said cover is secured to said baseplate.

9. An enclosure for a hard disk drive comprising:
    a baseplate having a first face being disposed about the periphery of said baseplate, said first face lying in a first plane, a first recess being disposed in said first face;
    a cover secured to said baseplate creating a space therebetween, said cover having a second face being disposed about the periphery of said cover, said second face lying in a second plane, said second plane being parallel to said first plane, said cover having a second recess being disposed in said second face such that said first and second recesses are aligned with one another, said first and second faces and said first and second recesses forming an interface between said cover and said baseplate; and
    a gasket for sealing said interface, said gasket having a first and second vertical member and a first and second horizontal member, said first vertical member being disposed in said first recess, said second vertical member being disposed in said second recess, said first and second horizontal members being disposed between said first and second faces.

10. The assembly as recited in claim 9, wherein said first and second recesses have a substantially rectangular cross-section.

11. The assembly as recited in claim 10, wherein said first and second recesses have a width of 0.02 to 0.1 inches and a depth of 0.02 to 0.1 inches.

12. The assembly as recited in claim 9, wherein said gasket comprises a closed-cell elastomeric material.

13. The assembly as recited in claim 9, wherein said first and second vertical members have a substantially parabolic cross-section, and said first and second horizontal members have a substantially rectangular cross-section.

14. The assembly as recited in claim 12, wherein said gasket has a 25A shore hardness.

15. The assembly as recited in claim 9, wherein said gasket and said first and second recesses are sized such that a 19% to 33% gasket compression ratio is established when said cover is secured to said baseplate.

16. An enclosure for a hard disk drive comprising:
    a baseplate having a first face being disposed about the periphery of said baseplate, said first face lying in a first plane, a first groove being disposed in said first face;
    a cover secured to said baseplate creating a space therebetween, said cover having a second face being disposed about the periphery of said cover, said second face lying in a second plane, said second plane being parallel to said first plane, said cover having a second groove being disposed in said second face such that said first and second grooves are aligned with one another, said first and second faces and said first and second grooves forming an interface between said cover and said baseplate; and
    an elastomeric gasket for sealing said interface, said gasket having a first and second vertical member and a first and second horizontal member, said first and second vertical members having a substantially parabolic shape, said first vertical member being disposed in said first groove, said second vertical member being disposed in said second groove, said first and second horizontal members being disposed between said first and second faces.

17. The assembly as recited in claim 16, wherein said first and second grooves have a substantially rectangular cross-section.

18. The assembly as recited in claim 17, wherein said first and second grooves have a width of 0.02 to 0.1 inches and a depth of 0.02 to 0.1 inches.

19. The assembly as recited in claim 16, wherein said gasket comprises a closed-cell, elastomeric material.

20. The assembly as recited in claim 19, wherein said gasket has a 25A shore hardness.

21. The assembly as recited in claim 16, wherein said gasket comprises urethane.

22. The assembly as recited in claim 16 wherein said gasket comprises Butyl.

23. The assembly as recited in claim 16, wherein said gasket and said first and second grooves are sized such that a 19% to 33% gasket compression ratio is established when said cover is secured to said baseplate.

24. A method for enclosing a magnetic recording system, comprising the steps of:
   a) forming a first face on the inside periphery of a baseplate;
   b) forming a first recess in said first face;
   c) forming a second face on the inside periphery of a cover;
   d) forming a second recess in said second face;
   e) disposing an elastomeric gasket having an X-shape cross-section in said first recess; and
   f) securing said cover to said baseplate such that said gasket is disposed between said first and second recesses and said first and second faces thereby forming an air tight seal between said cover and said baseplate.

25. The method as recited in claim 24, wherein the step of forming said first and second recesses includes casting said first and second recesses into said baseplate and said cover, respectively.

26. The method as recited in claim 24, wherein the step of forming said first and second recesses includes machining said first and second recesses into said baseplate and said cover, respectively.

27. A method for enclosing a hard disk drive, comprising the steps of:
   a) forming a first face on the inside periphery of a baseplate;
   b) forming a first recess in said first face;
   c) forming a second face on the inside periphery of a cover;
   d) forming a second recess in said second face;
   c) forming an elastomeric gasket having a first and second vertical member and a first and second horizontal member;
   d) disposing said first vertical member in said first recess; and
   e) securing said cover to said baseplate such that said second vertical member is disposed in said second recess and said first and second horizontal members are disposed between said first and second faces thereby creating an air tight seal between said cover and said baseplate.

28. The method as recited in claim 27, wherein the step of forming said first and second recesses includes casting said first and second recesses into said baseplate and said cover, respectively.

29. The method as recited in claim 27, wherein the step of forming said first and second recesses includes machining said first and second recesses into said baseplate and said cover, respectively.

30. The method as recited in claim 27, wherein said gasket and said first and second recesses are sized such that a 19% to 33% gasket compression ratio is established when said cover is secured to said baseplate.

31. A method for enclosing a hard disk drive, comprising the steps of:
   a) forming a first face on the inside periphery of a baseplate;
   b) forming a first groove having a substantially rectangular cross-section in said first face;
   c) forming a second face on the inside periphery of a cover;
   d) forming a second groove having a substantially rectangular cross-section in said second face;
   e) forming an elastomeric gasket having a first and second vertical member and a first and second horizontal member, said first and second vertical members having a substantially parabolic cross-section, said first and second horizontal members having a substantially rectangular cross-section;
   d) disposing said first vertical member in said first groove; and
   e) securing said cover to said baseplate such that said second vertical member is disposed in said second groove and first and second horizontal members are disposed between said first and second faces thereby creating an air tight seal between said cover and said baseplate.

32. The method as recited in claim 31, wherein the step of forming said first and second recesses includes casting said first and second recesses into said baseplate and said cover, respectively.

33. The method as recited in claim 31, wherein the step of forming said first and second grooves includes machining said first and second grooves into said baseplate and said cover, respectively.

34. The method as recited in claim 31, wherein said gasket and said first and second grooves are sized such that a 19% to 33% gasket compression ratio is established when said cover is secured to said baseplate 8.

* * * * *